Patented June 24, 1947

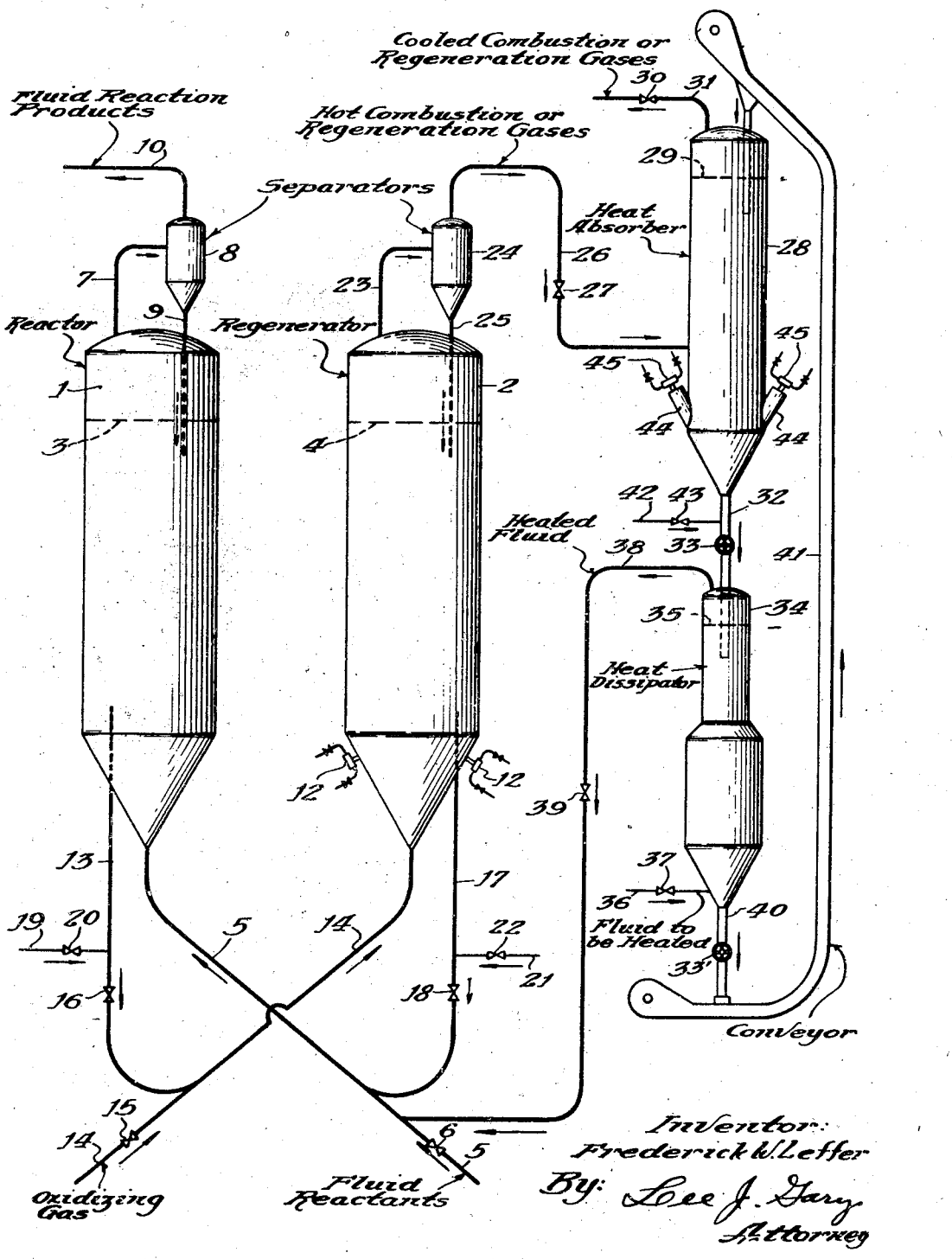

2,422,791

UNITED STATES PATENT OFFICE 2,422,791

ENDOTHERMIC CATALYTIC CONVERSION OF HYDROCARBONS

Frederick W. Leffer, Riverside, Ill., assignor to Universal Oil Products Company, Chicago, Ill., a corporation of Delaware Application July 30, 1945, Serial No. 607,889

17 Claims. (Cl. 196—52)

This application is a continuation-in-part of my co-pending application Serial No. 480,357, filed March 24, 1943.

The invention is directed to an improved process for the endothermic conversion of fluid reactants in the presence of a mass of subdivided solid contact material which possesses catalytic activity for promoting the desired reaction.

The process provided is more particularly related to the general type of endothermic hydrocarbon conversion operations in which deleterious heavy conversion products are deposited in the catalyst mass during the conversion reaction and wherein a stream of the contaminated catalyst is continuously supplied from the reaction zone to a regenerating zone in which a mass of the catalyst is maintained and the contaminants are removed therefrom by an exothermic reaction, resulting regenerated catalyst being continuously returned from the regenerating zone to the reaction zone. In such operations a substantial portion of the heat evolved in the regenerating step is stored in the subdivided catalytic material undergoing regeneration and supplied therewith to the reaction zone to furnish heat required for conducting the endothermic conversion of the reactants supplied to the latter. However, a considerable quantity of the heat evolved in the regenerating step is removed from the regenerating zone in the outgoing stream of spent or partially spent regenerating gas.

It has been observed that in many instances when carrying out hydrocarbon conversion reactions of a highly endothermic nature such as for example in the production of butadiene, acetylene and the like from more highly saturated hydrocarbons, there is not always a sufficient deposit of combustible contaminants on the contact material during the conversion to furnish all of the heat required for conducting the endothermic conversion reaction by the heat imparted to the catalyst during combustion of the contaminants therefrom, even when additional heat for use in the conversion reaction is recovered from the hot regenerating gas obtained in the catalyst regeneration. It has further been observed that under the foregoing conditions the combustion of extraneous fuel in the catalyst regeneration step in quantities adequate to impart to the regenerated catalyst an amount of heat sufficient to satisfy the heat requirement of the endothermic conversion reaction in the reaction zone rarely solves the problem of process heat supply satisfactorily since catalysts of the currently used type and particularly those distinguished by high activity for promoting endothermic conversion reactions in the nature of dehydrogenation are easily overheated to temperatures resulting in deactivation and leaving the catalyst in a permanently impaired condition.

It is therefore a primary object of the present invention to provide an improved method for supplying substantially all of the heat required for the endothermic conversion process under conditions precluding catalyst deactivation resulting from overheating of the catalyst.

In numerous endothermic hydrocarbon conversion reactions the presence of a diluent which may be constituted by a relatively inert gas or by a gaseous or vaporous medium which may in part react in the hydrocarbon conversion reaction is desirable in order to reduce the concentration of the hydrocarbon undergoing conversion or of the hydrocarbon conversion product or of both the hydrocarbon conversion charge and product in the total fluid reaction mixture during contact with the catalyst. It is therefore another important object of the invention to provide a practical and efficient method for furnishing such diluent to the reaction zone under optimum conditions of temperature and quantity.

Another object of the invention is to accomplish catalyst regeneration at temperatures below catalyst deactivation temperature and concomitantly supply substantially all of the heat necessary for the endothermic conversion reaction in the materials to be supplied to the reaction zone by a method which permits to augment the heat returned to the reaction zone in the regenerated catalyst particles by readily controlled amounts of heat generated outside the catalyst regenerating zone and transferred to a fluid heat transferring medium which is introduced to the reaction zone.

A still further object of the invention is to transmit heat generated by combustion of fuel outside the catalyst regeneration zone to the reaction zone in a fluid medium which may be either a portion or all of the reactants to be endothermically converted or which may be an auxiliary fluid employed in the reaction zone for some useful purpose in addition to its function as heat carrying medium.

The method provided by this invention for furnishing the heat for the endothermic conversion reaction to the reaction zone obviates the use of costly tubular type heat exchangers and the like by employing subdivided solid heat retentive material which is heated to a higher temperature than that of the catalyst entering the reaction zone or undergoing regeneration in the regeneration zone while said heat retentive material moves through a confined zone, hereinafter referred to as heat absorption zone, and therein is heated by direct contact with hot combustion gases, the heat retentive material being transferred in heated state to a separate confined zone, hereinafter referred to as heat dissipating zone, through which it moves in counter-current direct contact with the fluid medium which is to be heated and then to be supplied in highly heated state to the reaction zone, the resulting cooled heat retentive material being continuously returned from the heat dissipating zone to the heat absorption zone to establish a closed cycle through which it is continuously circulated independently of any circulation of the bulk of catalyst passing through the reaction zone.

The invention therefore in one aspect provides for the endothermic catalytic conversion of hydrocarbons by a continuous process which comprises contacting the hydrocarbon conversion charge in a reaction zone with subdivided catalyst particles at reaction temperature for a sufficient time to effect the endothermic conversion while catalyst passes continuously through said reaction zone and a stream of the catalyst particles is supplied to the reaction zone at a temperature and in a quantity insufficient to furnish all of the heat of the endothermic reaction, simultaneously maintaining a separate cyclic flow of solid subdivided heat retentive material different from the catalyst through a heat absorption zone and a heat dissipating zone, heating the heat retentive material in the heat absorption zone to a temperature substantially above that of the catalyst stream supplied to the reaction zone, transferring heat from the heat retentive material to a fluid heat transferring medium during countercurrent direct contact of the latter with the heat retentive material in the heat dissipating zone, and supplying heated heat transferring medium from the heat dissipating zone to the reaction zone at a temperature and in a quantity sufficient to adiabatically accomplish the endothermic conversion in the last mentioned zone.

In another aspect the invention provides for the endothermic catalytic conversion of hydrocarbons by a continuous process wherein the hydrocarbon conversion charge is contacted in a reaction zone with subdivided catalyst particles at reaction temperature for a sufficient time to effect the endothermic conversion, a stream of contaminated catalyst particles is withdrawn from the reaction zone and regenerated in a confined regenerating zone at a temperature substantially below catalyst deactivation temperature, hot regenerated catalyst is returned to the reaction zone at a temperature and in a quantity insufficient to furnish all of the heat required for the endothermic reaction, subdivided solid heat retentive material different from the catalyst is simultaneously heated in a confined heat absorption zone to a temperature substantially above that imparted to the catalyst in the regenerating zone, heat is transferred from the heated heat retentive material to a fluid heat transferring medium by countercurrent direct contact in a confined heat dissipating zone, and a stream of thus heated fluid medium is supplied to the reaction zone at a temperature and in a quantity sufficient for adiabatically accomplishing the endothermic conversion in the last mentioned zone.

The features of the invention are applicable to a wide variety of endothermic hydrocarbon conversion processes and the invention is not limited to the use of its features in conducting any specific reaction. However, it is particularly advantageous as applied to the conversion of hydrocarbons by such reactions as cracking and dehydrogenation, for example, and in one specific embodiment it is particularly directed to endothermic hydrocarbon conversion reactions of the type employing relatively inert gas, such as steam, for example, in the reaction zone to give a low effective pressure therein and thereby facilitate the desired conversion of the hydrocarbons to more valuable products, such as butadiene, acetylene, or the like. The subsequent description will be directed principally to this type of operation as illustrative of the advantages which may be achieved by use of the features herein provided.

One specific embodiment of the process provided by the invention is as follows: A bed of subdivided solid catalyst maintained in the reaction zone is kept in turbulent fluid-like condition by passing the fluid reactants and resulting vaporous and/or gaseous conversion products upwardly therethrough in contact with the solid particles at a net upward velocity greater than that of the solid particles, whereby the phenomenon known as "hindered settling" is obtained. There is thus maintained in the reaction zone a relatively dense lower phase containing a high concentration of solid particles and a light upper phase containing a substantially lower concentration of solid particles. A similar fluid-like or dense phase of the subdivided solid catalyst is maintained in the regenerating zone by passing oxidizing gas employed for burning combustible contaminants from the solid particles upwardly through the regenerating zone at a net upward velocity greater than that of the solid particles.

A stream of the solid catalyst particles is continuously withdrawn from the dense phase or fluid bed in the reactor and, after being substantially stripped of readily vaporizable hydrocarbons, this stream is supplied to the dense phase or fluid bed in the regenerating zone. Another stream of the solid contact material is continuously withdrawn from the dense phase or fluid bed in the regenerating zone and, after being substantially stripped of oxygen-containing gas is supplied to the dense phase in the reaction zone.

Vaporous and/or gaseous hydrocarbon conversion products and entrained solid particles are directed from the light phase in the reactor to suitable separating equipment wherein at least a substantial portion of the solid particles are removed and from which they are returned to the dense phase or fluid bed in the reactor. The vaporous and/or gaseous reactants pass from the separating equipment. Hot regenerating gas is directed with entrained solid particles from the light phase in the regenerator to suitable separating equipment wherein all or a substantial portion of the solid particles are separated and from which they are returned to the dense phase in the regenerator.

Hot gases from the last mentioned separating equipment are preferably directed to a heat absorption zone through which they pass upwardly in countercurrent contact with a downwardly moving relatively compact mass of subdivided solid heat retentive material, such as, for example, fire-clay particles, calcined shale, quartz, sand, Carborundum, refractory metal particles or the like, having generally a greater heat stability than the catalyst employed in the conversion reaction and being therefore suitable under the more severe temperature conditions encountered in this zone, as compared to the temperature conditions in the reaction zone and the catalyst regenerating zone. Heat is supplied to the heat retentive material in the heat absorption zone from the hot regenerating gas and from combustion gases generated with the aid of burners immediately adjacent to or debouching into the lower portion of the heat absorption zone. The resulting cooled regenerating and combustion gases are discharged from the upper portion of this confined zone. The hot subdivided solid heat retentive material is directed from the heat absorption zone at a temperature above the temperatures of the catalyst entering the reaction zone or undergoing regeneration into another confined zone, namely the heat dissipating zone wherein a downwardly moving bed thereof is countercurrently contacted with a suitable relatively inert fluid heat carrying medium, such as steam or water for example, to supply heat to the latter. The resulting highly heated fluid is directed from the upper portion of the last named zone into the lower portion of the fluid bed in the reactor and passes upwardly therethrough with the hydrocarbon reactants supplied to this zone and the resulting conversion products, thereby supplying heat to the reaction zone and reducing the effective pressure on the hydrocarbons present in the latter by the partial pressure effect of said relatively inert fluid. After contact with the relatively inert fluid to be heated, the subdivided solid heat retentive material is returned from the lower portion of the heat dissipating zone to the upper portion of the downwardly moving mass thereof in the heat absorption zone to establish a closed cycle through which the heat retentive material is continuously passed.

The accompanying diagrammatic drawing illustrates one specific form of apparatus in which the improved process provided by the invention may be successfully conducted and the following description of the drawing includes a more detailed description of the specific embodiment of the invention above outlined.

The apparatus illustrated comprises a reactor 1 and a regenerator 2, each of which is a vertically disposed cylindrical vessel and within each of which a fluidized bed of subdivided solid contact material is maintained, as explained above. The concentration of solid particles is materially less in the upper portion of each of these vessels than in its lower portion. The approximate line of demarcation between the light upper phase and the dense lower phase is indicated at 3 in the reactor and at 4 in the regenerator.

Hydrocarbon reactants to be converted are supplied, preferably in preheated vaporous state, to the lower portion of reactor 1 through line 5 and valve 6, together with subdivided solid catalyst supplied to line 5 from the regenerator, as will be later described. The hydrocarbon vapors passing through line 5 carry the catalyst principally by their gas-lift action and the commingled stream of vaporous reactants and subdivided solid catalyst entering the cone-shaped lower end of reactor 3 from line 5 is substantially uniformly distributed over the cross-sectional area of the vessel. The hydrocarbon vapors and resulting vaporous and gaseous conversion products pass upwardly through the reactor at a net upward velocity greater than that of the subdivided solid catalyst. The greater gravitation attraction of the solid particles, as compared with the hydrocarbon vapors and gases, results in the phenomenon known as "hindered settling" in reactor 1, whereby a local circulation of the solid particles is obtained to give a turbulent fluid-like bed of the solid contact material in the reaction zone.

Vaporous and/or gaseous conversion products resulting from conversion of the hydrocarbons under temperature and pressure conditions maintained in reactor 1 are directed, with entrained or suspended particles of the subdivided solid contact material, from the light upper phase in the reactor through line 7 to suitable equipment, such as, for example, the cyclone separator 8, wherein all or a major portion of the subdivided catalyst is separated from said conversion products. The separated catalyst is returned, in the case illustrated, from the lower portion of separator 8 through standpipe 9 to the relatively dense phase in the reactor. The vaporous and/or gaseous hydrocarbon conversion products are directed from the upper portion of separator 8 through line 10 to suitable fractionating and recovery equipment not pertinent to the present invention and, therefore, not illustrated.

Conversion of the hydrocarbon reactants in reactor 1, in addition to producing the desired relatively light products, also results in the formation of appreciable quantities of heavier conversion products of a carbonaceous or hydrocarbonaceous nature. The latter accumulate on the particles of subdivided solid catalyst in the fluid bed in the reactor and, to keep the solid catalyst in heated state, a stream thereof is continuously supplied from reactor 1 to regenerator 2, wherein combustible deposits are continuously burned from the contact material, and a stream of the resulting highly heated catalyst particles is continuously returned from the regenerator to the reactor. The regenerator 2 may be provided at its lower portion with burners 12 for supplying extraneous fuel and air for its combustion so that the catalyst regeneration may be aided by combustion of regulated quantities of extraneous fuel if so desired, as for example, when the combustible catalyst contaminants are insufficient to maintain the desired regeneration temperature.

To accomplish circulation of the solid catalytic material a stream or moving column thereof is directed downwardly from the fluid bed in reactor 1 through standpipe 13 into line 14 through which air or other oxygen-containing gas is passed. Introduction of the oxygen-containing gas is regulated by valve 15 in line 14 and standpipe 13 joins line 14 on the downstream side of valve 15. A suitable restriction, such as a valve or adjustable orifice indicated at 16, is disposed in standpipe 13 adjacent its lower end to regulate the flow of subdivided solid material from the standpipe into line 14. By commingling the oxygen-containing gas with the subdivided solid material in line 14, the density of the commingled materials in line 14 is considerably reduced as compared with that of the material passing through standpipe 13 above valve 16. Thus, the subdivided solid catalyst is transported from the reactor to the regenerator, principally by the gas-lift action of the air or other oxygen-containing gas passing through line 14.

The stream of oxidizing gas and subdivided solid material is directed from line 14 into the substantially cone-shaped lower head of regenerator 2, wherein the oxidizing gas serves to burn the combustible deposits from the solid particles of catalyst and wherein the upwardly flowing oxidizing gas and resulting combustion gases fluidize the bed of subdivided solid material in the regenerator in substantially the same manner as the bed in reactor 1 is fluidized by the vaporous hydrocarbon reactants and resulting vaporous and gaseous conversion products.

To complete the circuit of subdivided solid catalyst, a stream or column of hot regenerated solid particles is directed from the fluid bed in regenerator 2 downwardly through standpipe 17, containing the adjustable orifice or flow control valve 18 adjacent its lower end, into line 5, wherein the solid material is commingled with the incoming hydrocarbon reactants and transported, principally by their gas-lift action, back to reactor 1 as hereinbefore described.

To prevent the transfer of hydrocarbon reactants and vaporous and gaseous conversion products from reactor 1 to regenerator 2 and to fluidize and prevent excessive compaction of the column of subdivided solid material in standpipe 13, this column is substantially stripped of hydrocarbon reactants and conversion products by introducing relatively small quantities of substantially inert gas, such as steam, for example, into the standpipe at one or a plurality of points above the valve or orifice 16. In the case illustrated, the stripping and fluidizing medium is introduced through line 19 and valve 20. In a similar manner, steam or other suitable stripping gas is introduced through line 21 and valve 22 into standpipe 17 to substantially strip the column of subdivided solid material therein of oxidizing gas and combustion gases and to fluidize the column and prevent excessive compaction of the solid particles.

The subdivided solid catalyst employed is a material which will withstand the conditions of operation in reactor 1 and in regenerator 2 and which either has a more or less pronounced catalytic effect in promoting the desired hydrocarbon conversion reaction or is a mixture of a catalyst effective in promoting the desired conversion reaction with a relatively inert material, such as crushed firebrick, calcined clays, quartz and similar materials which will remain in subdivided solid state, will not detrimentally affect the conversion reaction and which are of sufficient density to retain a substantial portion of the heat generated by burning of combustible deposits therefrom in the regenerating step. I specifically contemplate the use of finely divided or powdered solid cracking or dehydrogenating catalyst of any well known type, such as the powdered or pulverized types or the newer microspherical types, which is capable of withstanding the operating conditions employed without fluxing or excessively rapid degradation in activity.

Hot combustion gases resulting from burning of the carbonaceous or hydrocarbonaceous deposits in regenerator 2 are directed, together with suspended or entrained particles of subdivided solid material from the relatively light phase in regenerator 2 through line 23 to suitable separating equipment, such as the cyclone separator indicated at 24, wherein all or a substantial portion of the subdivided solid catalyst is separated from the combustion gases. In the case illustrated, the thus separated contact material is returned from the lower portion of separator 24 through standpipe 25 to the dense phase or fluid bed in the regenerator.

Although a substantial portion of the heat generated in regenerator 2 will be stored in the subdivided solid material of the fluid bed maintained therein and is preferably made available for use in the conversion reaction by return of hot regenerated material substantially without any intervening cooling thereof to reactor 1, the combustion gases discharged from the regenerating zone also contain a considerable quantity of heat and, due to the relatively high temperature of these gases, a large portion of the heat which they contain is readily available.

In a preferred mode of operation according to the invention, the hot spent or partially spent regeneration gases are directed from separator 24 through line 26 and valve 27 into a heat absorption zone constituted essentially by a heat absorbed in the form of the elongated cylindrical vessel 28, wherethrough the gases flow countercurrent to and in direct contact with a downwardly moving bed of subdivided solid particles of suitable heat retentive material to which they supply a substantial portion of their heat. Preferably, the bed of solid particles in vessel 28 comprises a continuous relatively compact mass rather than a fluidized mass of the type maintained, in the particular case of the specific embodiment herein described, in the reactor and regenerator, the approximate upper limit of this bed in vessel 28 being indicated at 29. The particles comprising the bed of heat retentive material are preferably granular and of a substantially larger size than the solid catalyst particles maintained in the conversion zone.

In accordance with the invention the heat absorber 28 is designed to function in a manner which permits the supply of readily controlled amounts of heat to the reaction zone in addition to any heat furnished by the catalyst supplied in heated state to the reaction zone. To this end, one or more side-arm combustion zones 44 are provided on vessel 28, wherein hot combustion gases are generated from fuel and air supplied thereto from an extraneous source through burners 45 and introduced into the bed of heat retentive material passing through vessel 28. The provision for burning extraneous fuel in the side-arms of vessel 28 makes it possible to augment the heat supply for the reaction zone in any desired amount independent of the provisions for burning combustible contaminants from the catalyst or burning both such combustible contaminants and extraneous fuel in the regenerating step. This feature permits supplying all of the necessary heat to the reaction zone without employing an excessively high temperature in the regenerating step and therefore without any danger of damaging or permanently deactivating the catalyst during the regeneration. This feature moreover permits to avoid undesired high temperatures in the preheating of the hydrocarbon conversion charge, particularly temperatures above the desired conversion temperature whenever such preheating is liable to cause undesired decomposition reactions distinguished from the reactions promoted by the catalyst employed for the desired conversion reaction. In applying the feature of heat supply to the heat retentive material by combustion of extraneous fuel the heat retentive material can be heated to temperatures considerably above those permissible as maxima in the catalyst regeneration and the heat thus imparted to the heat retentive material will be made available for use in the reaction zone in the stream of reactants and/or inert fluid heat carrying medium or diluent being supplied to the reactor from chamber 34 as hereafter described. Preferably the hot regeneration gases from line 26 are introduced to the vessel 28 at a point intermediate the side arms 44 and the gas outlet 31 in order that heat may be abstracted from the regeneration gases by the heat retentive solid material before the latter is contacted with the hotter combustion gases generated in the side-arms 44.

The hot subdivided solid or granular heat retentive material is continuously directed from the lower portion of vessel 28 through conduit 32 into another elongated cylindrical vessel comprising the heat dissipator 34, and when desired, its flow from vessel 28 to vessel 34 may be controlled by suitable means, such as an adjustable orifice, slide valve, star feeder or the like, indicated at 33, in conduit 32, although such flow regulating means will not ordinarily be required.

A bed of the heat retentive solid material is maintained in vessel 34, the approximate upper limit of this bed being indicated at 35, and moves downward through the vessel countercurrent to and in direct contact with the fluid to be heated in this zone. The latter is supplied to the lower portion of vessel 34 through line 36 and valve 37 and may comprise water, steam or other suitable fluid relatively inert to the reaction being conducted in reactor 1, or it may comprise a portion or all of the reactants to be converted in the reactor. For example, as applied to the high temperature cracking and dehydrogenation of normally gaseous or liquid hydrocarbons the stream supplied to vessel 34 through line 36 may be a mixture of the hydrocarbon reactants in either vaporous or liquid state with steam or water, or it may be the reactants alone or steam or water alone or another relatively inert fluid, such as light hydrocarbon gases, nitrogen, carbon dioxide or the like.

The bed of subdivided solid heat retentive material passing through vessel 34 may, like the bed in vessel 28, comprise a relatively compact mass of solid particles or it may comprise a fluidized mass similar to the fluid beds in the reactor and regenerator. In the preferred embodiment of the invention, fluidization of the bed in vessel 34 is limited so as to avoid excessive turbulence which would tend to equalize temperatures between the upper and lower portions of the bed. The solid particles and fluid undergoing heating flow through vessel 34 in a generally countercurrent direction, whereby the subdivided solid heat retentive material is discharged at a relatively low temperature from the lower portion of the vessel, while the heated fluid is discharged from the upper portion of the vessel at a temperature closely approaching that at which the heated solid material is supplied thereto from vessel 28.

The fluid heated in heat dissipator 34 is directed from the upper portion of this zone through line 38 and valve 39 into line 5, wherein it assists in fluidizing and transporting to the reactor the solid catalyst particles supplied to line 5 from the regenerator through standpipe 17. The commingled materials in line 5 are directed therefrom, as hereinbefore described, into the lower portion of the fluid bed in the reactor.

Subdivided solid heat retentive material from which heat has been abstracted in vessel 34 is directed from the lower portion of this zone through conduit 40 to a suitable continuous conveyer, indicated at 41, and motivated by any convenient well known means, not illustrated, whereby the solid particles are returned to the bed thereof maintained in the heat absorber 28 to give a continuous closed cycle through vessel 28, vessel 34 and through the conveyer back to vessel 28. When desired, suitable flow regulating means 33', like that indicated at 33, may be provided in conduit 40.

It is usually desirable to prevent combustion gases from entering the reaction zone, since they may contain unused oxygen which would cause oxidation of the hydrocarbon reactants and, in any event, will ordinarily contaminate and be difficult to separate from the hydrocarbon conversion products. To accomplish this, steam or other relatively inert gas may be introduced through line 42 and valve 43 into the column of solid heat retentive particles passing through the transfer conduit 32, connecting vessels 28 and 34, to flow upwardly through this column and substantially strip the same of combustion gases. Also, the height and density of the column of solid particles in line 32 is preferably sufficient to preclude the flow of heated fluid from vessel 34 through line 32 into vessel 28.

I claim as my invention:

1. A continuous process for the endothermic catalytic conversion of hydrocarbons which comprises contacting the hydrocarbon conversion charge in a reaction zone with subdivided catalyst particles at reaction temperature for a sufficient time to effect the endothermic conversion, removing contaminated catalyst particles from said reaction zone and burning carbonaceous matter therefrom in a regenerating zone, separating resultant combustion gases from regenerated catalyst particles and returning the latter to the reaction zone at a temperature and in a quantity insufficient to furnish all of the heat of the endothermic reaction, simultaneously maintaining a separate cyclic flow of solid subdivided heat retentive material different from said catalyst through a heat absorption zone and a heat dissipating zone, contacting separated combustion gases from the regenerating zone with the heat retentive material in the heat absorption zone and heating said material in the last named zone to a temperature substantially above that of the regenerated catalyst particles supplied to the reaction zone, transferring heat from said heat retentive material to a fluid heat transferring medium by direct contact of the latter with said heat retentive material in the heat dissipating zone, and supplying heated heat transferring medium from said heat dissipating zone to the reaction zone at a temperature and in a quantity sufficient to adiabatically accomplish the endothermic conversion in the last mentioned zone.

2. A continuous process for the endothermic catalytic conversion of hydrocarbons which comprises maintaining a cyclic flow of subdivided solid catalyst through a reaction zone and a regenerating zone, simultaneously maintaining a separate cyclic flow of subdivided solid heat retentive material different from said catalyst through a heat absorption zone and a heat dissipating zone, contacting the hydrocarbon conversion charge with the catalyst in the reaction zone at a temperature and for a time adequate to effect the endothermic reaction while insufficient heat for this reaction is furnished in the catalyst supplied in heated state from the regenerating zone to the reaction zone, heating the heat retentive material in the heat absorption zone to a temperature substantially above that to which the catalyst is heated in the regenerating zone by contacting said material with hot gases including combustion gases from the regenerating zone, transferring heat from said heat retentive material to a fluid heat transferring medium during countercurrent direct contact thereof with said heat retentive material in the heat dissipating zone, and supplying heated heat transferring medium from said heat dissipating zone to the reaction zone at a temperature and in a quantity sufficient to adiabatically accomplish the endothermic conversion in the last mentioned zone.

3. A continuous process for the endothermic catalytic conversion of hydrocarbons which comprises contacting the hydrocarbon conversion charge in a reaction zone with subdivided catalyst particles at reaction temperature for a sufficient time to effect the endothermic conversion, withdrawing a stream of contaminated catalyst particles from said reaction zone and regenerating the withdrawn catalyst particles in a confined regenerating zone at a temperature substantially below catalyst deactivation temperature, returning hot regenerated catalyst to the reaction zone at a temperature and in a quantity insufficient to furnish all of the heat required for the endothermic reaction, simultaneously heating subdivided solid heat retentive material different from the catalyst in a confined heat absorption zone to a temperature substantially above that imparted to the catalyst in said regenerating zone by contacting said material with hot gases including combustion gases from the regenerating zone, transferring heat from the heated heat retentive material to a fluid heat transferring medium by direct contact in a confined heat dissipating zone, and supplying a stream of thus heated fluid medium to the reaction zone at a temperature and in a quantity sufficient for adiabatically accomplishing the endothermic conversion in the last mentioned zone.

4. A continuous process for the endothermic catalytic conversion of hydrocarbons which comprises maintaining a cyclic flow of subdivided solid catalyst through a reaction zone and a regenerating zone, simultaneously maintaining a separate cyclic flow of subdivided solid heat retentive material different from said catalyst through a heat absorption zone and a heat dissipating zone, supplying a hydrocarbon conversion charge in preheated vaporous state to the reaction zone and therein contacting the same in the presence of a gaseous diluent with the catalyst at a temperature and for a time adequate to effect the endothermic reaction while insufficient heat for this reaction is furnished in the preheated hydrocarbon charge and in the catalyst supplied in heated state from the regenerating zone to the reaction zone, heating the heat retentive material in the heat absorption zone to a temperature substantially above that to which the catalyst is heated in the regenerating zone by contacting said material with hot gases including combustion gases from the regenerating zone, transferring heat from said heat retentive material to a fluid heat transferring medium by direct contact thereof with said heat retentive material in the heat dissipating zone, and supplying resultant heated gaseous heat transferring medium from said heat dissipating zone as said diluent to the reaction zone at a temperature and in a quantity sufficient to adiabatically accomplish the endothermic conversion in the last mentioned zone.

5. A continuous process for the endothermic catalytic conversion of hydrocarbons which comprises subjecting a hydrocarbon reactant to conversion conditions in contact with finely divided solid catalyst in a reaction zone, continuously passing catalyst particles contaminated by carbonaceous deposits from said reaction zone to a regenerating zone and therein burning said contaminants from the particles by contact with oxygen-containing gas at a combustion temperature below catalyst deactivation temperature, continuously returning regenerated catalyst particles from said regenerating zone to said reaction zone in a quantity and at a temperature insufficient to supply all of the heat of the endothermic reaction, contacting hot regeneration gases from said regenerating zone with a heat retentive material different from said catalyst in a heat absorption zone whereby to transfer heat from said regeneration gases to said heat retentive material, further contacting said heat retentive material with combustion gases of higher temperature than that of said regeneration gases and thereby heating said heat retentive material to a temperature substantially above the temperature imparted to the catalyst in the regenerating zone, transferring heat from the heated heat retentive material to a fluid heat transferring medium by direct contact in a heat dissipating zone, and supplying heated heat transferring medium from said heat dissipating zone to the reaction zone at a temperature and in a quantity sufficient to adiabatically accomplish the endothermic conversion in the last mentioned zone.

6. A process such as defined in claim 5 further characterized in that the hydrocarbon reactant is supplied to the reaction zone in preheated vaporous state, the combined heat content of the streams of preheated hydrocarbon reactant and regenerated catalyst supplied to the reaction zone is insufficient for furnishing therein all of the endothermic heat requirement of the conversion reaction, and a relatively inert fluid heat transferring medium is supplied to the heat dissipating zone and therefrom in gaseous state to the reaction zone at a temperature above the temperatures of said streams of hydrocarbon reactant and regenerated catalyst flowing to the reaction zone so as to augment the heat content of the last mentioned streams sufficiently to satisfy the heat requirements for the endothermic conversion in the reaction zone and to therein reduce the partial pressure of the hydrocarbons present.

7. A continuous process for the endothermic catalytic conversion of hydrocarbons which comprises maintaining a cyclic flow of subdivided solid catalyst through a reaction zone and a regenerating zone, simultaneously maintaining a separate cyclic flow of subdivided solid heat retentive material different from said catalyst through a heat absorption zone and a heat dissipating zone, supplying a hydrocarbon reactant in preheated vaporous state to the reaction zone and therein contacting the same in the presence of a gaseous diluent with the catalyst at a temperature and for a time adequate to effect the endothermic reaction while insufficient heat for this reaction is furnished in said preheated reactant and in the catalyst supplied in heated state from the regenerating zone to the reaction zone, heating the heat retentive material in the heat absorption zone by direct contact with hot combustion gases, including regeneration gases from the regenerating zone, to a temperature substantially above that to which the catalyst is heated in the regenerating zone, transferring heat from the heated heat retentive material to a fluid heat transferring medium during countercurrent direct contact thereof with said heat retentive material in the heat dissipating zone, and supplying a stream of resultant gaseous heat transferring medium from said heat dissipating zone as said diluent to the reaction zone at a temperature and in a quantity sufficient to adiabatically accomplish the endothermic conversion in the last mentioned zone.

8. A process such as defined in claim 7 further characterized in that a normally gaseous hydrocarbon is supplied as the hydrocarbon reactant to the reaction zone and a fluid medium relatively inert under the conversion conditions employed in the reaction zone is highly heated in the heat dissipating zone and supplied from the latter to the reaction zone as heat transferring medium and diluent.

9. A continuous process for the endothermic catalytic conversion of hydrocarbons which comprises subjecting a hydrocarbon reactant to endothermic conversion conditions in contact with finely divided solid catalyst particles in a reaction zone, supplying a stream of hot regenerated catalyst particles from a catalyst regenerating zone to said reaction zone at a temperature and in a quantity insufficient to furnish all of the endothermic heat requirement of the conversion reaction, removing a stream of contaminated catalyst particles from the reaction zone and supplying the same to said regenerating zone maintained at a combustion temperature below catalyst deactivation temperature and containing a relatively dense bed of finely divided contaminated catalyst undergoing regeneration, passing an oxygen-containing gas through said bed in a quantity sufficient for substantially burning the carbonaceous contaminants from the catalyst particles, removing resultant hot combustion gases from the regenerating zone and passing them countercurrently through a relatively cool portion of a compact mass of subdivided heat retentive material moving through a heat adsorption zone, further heating said mass during its passage through said heat adsorption zone by countercurrent direct contact with combustion gases of substantially higher temperature than that maintained in the bed of catalyst particles undergoing regeneration, thereafter passing a relatively cool fluid heat transferring medium counter-currently through the thus heated mass of heat retentive material during the passage of the latter in a compact bed of particles through a heat dissipating zone, thereby transferring heat from said mass to said fluid medium, and introducing a stream of the thus heated fluid medium to the reaction zone at a temperature and in a quantity sufficient for adiabatically accomplishing the endothermic conversion in the last mentioned zone.

10. A process as defined in claim 9 further characterized in that a stream of cooled particles of the heat retentive material is returned from the heat dissipating zone to the heat absorption zone for further countercurrent contact therein with the regeneration gases and combustion gases, a stream of the hydrocarbon reactant is supplied in preheated vaporous state to the reaction zone while the combined heat content of the streams of hydrocarbon reactant and regenerated catalyst flowing to the reaction zone is insufficient to furnish all of the endothermic heat requirement of the conversion reaction, and a fluid heat transferring medium substantially free from said hydrocarbon reactant is supplied to the heat dissipating zone and therefrom in gaseous state to the reaction zone at a temperature above the temperatures of said streams of hydrocarbon reactant and regenerated catalyst flowing to the reaction zone so as to augment the heat content of the last mentioned streams sufficiently to satisfy the heat requirements for the endothermic conversion in the reaction zone.

11. A process such as defined in claim 9 further characterized in that a normally gaseous hydrocarbon is supplied as the hydrocarbon reactant to the reaction zone and a fluid medium relatively inert under the conversion conditions employed in the reaction zone is highly heated during countercurrent contact with the moving bed of subdivided heat retentive material in the heat dissipating zone and supplied from the latter to the reaction zone as heat transferring medium and as diluent for the fluid hydrocarbon reaction mixture in the reaction zone.

12. A continuous process for the endothermic catalytic conversion of hydrocarbons which comprises contacting a hydrocarbon reactant in a reaction zone with subdivided catalyst particles at reaction temperature for a sufficient time to effect the endothermic conversion of said reactant, removing contaminated catalyst particles from said reaction zone and burning carbonaceous matter therefrom in a regenerating zone, separating resultant combustion gases from regenerated catalyst particles and returning the latter to said reaction zone at a temperature and in a quantity insufficient to furnish all of the heat of the endothermic reaction, simultaneously maintaining a separate cyclic flow of subdivided solid heat retentive material different from said catalyst through a heat absorption zone and a heat dissipating zone, passing said heat retentive material in a compact mass of particles downwardly through said heat absorption zone and therein heating the same by countercurrent direct contact with hot combustion gases, including separated combustion gases from the regenerating zone, to a temperature substantially above that of the regenerated catalyst particles supplied to the reaction zone, highly heating a fluid heat transferring medium by passing the heated heat retentive material in a compact mass of particles downwardly through said heat dissipating zone in countercurrent direct contact with said fluid medium, and introducing a stream of the thus heated fluid medium to the reaction zone at a temperature and in a quantity sufficient for adiabatically accomplishing the endothermic conversion in the last mentioned zone.

13. A process as defined in claim 12 further characterized in that said fluid heat transferring medium comprises hydrocarbon reactant to be converted in the reaction zone.

14. A process as defined in claim 12 further characterized in that a stream of hydrocarbon reactant is introduced in vaporous state to the reaction zone while the combined heat content of the streams of reactant and catalyst supplied to the reaction zone is insufficient to furnish all of the endothermic heat requirement of the conversion reaction, and a gaseous medium relatively inert under the conversion conditions employed in the reaction zone is heated during countercurrent direct contact with the compact mass of heat retentive material moving downwardly through the heat dissipating zone to a higher temperature than the temperatures of said streams of reactant and catalyst flowing to the reaction zone and is thereupon supplied to the reaction zone.

15. A process as defined in claim 12 further characterized in that a stream of hydrocarbon reactant is introduced in vaporous state into the reaction zone while the combined heat content of the streams of reactant and catalyst supplied to the reaction zone is insufficient to furnish all of the endothermic heat requirement of the conversion reaction, a fluid medium comprising $H_2O$ is introduced into the lower portion of the heat dissipating zone and therein heated during its countercurrent direct contact with the downwardly moving compact mass of heat retentive material, and resultant steam at a temperature above the temperatures of said streams of reactant and catalyst flowing to the reaction zone is supplied to the latter.

16. A hydrocarbon conversion process which comprises endothermically converting the hydrocarbons in contact with subdivided solid catalyst in a reaction zone, removing contaminated catalyst particles from said zone and burning carbonaceous matter therefrom in a regenerating zone, separating resultant hot combustion gases from regenerated catalyst particles and returning the latter to the reaction zone, contacting separated hot combustion gases from the regenerating zone with a solid heat retentive material to heat the latter, thereafter contacting said material with a fluid heat transfer medium to transfer heat from the former to the latter, and introducing the thus heated fluid transfer medium to said reaction zone to supply heat for the endothermic conversion reaction in the last-named zone.

17. A hydrocarbon conversion process which comprises endothermically converting the hydrocarbons in contact with subdivided solid catalyst in a reaction zone, removing contaminated catalyst particles from said zone and burning carbonaceous matter therefrom in a regenerating zone, separating resultant hot combustion gases from regenerated catalyst particles and returning the latter to the reaction zone, commingling fresh combustion gases with the combustion gases from the regenerating zone and contacting the resultant mixture with a solid heat retentive material to heat the latter, thereafter contacting said material with a fluid heat transfer medium to transfer heat from the former to the latter, and introducing the thus heated fluid transfer medium to said reaction zone to supply heat for the endothermic conversion reaction in the last-named zone.

FREDERICK W. LEFFER.

REFERENCES CITED

The following references are of record in the file of this patent:

UNITED STATES PATENTS

| Number | Name | Date |
| --- | --- | --- |
| 1,148,331 | Olsson | July 27, 1915 |
| 1,178,667 | Niewerth | Apr. 11, 1916 |
| 1,614,387 | Pereda | Jan. 11, 1927 |
| 2,216,986 | Roe | Oct. 8, 1940 |
| 2,231,231 | Subkow | Feb. 11, 1941 |
| 2,320,318 | Simpson et al. | May 25, 1943 |
| 2,348,009 | Johnson et al. | May 2, 1944 |
| 2,340,478 | Tyson et al. | May 23, 1944 |